(12) United States Patent
Lee et al.

(10) Patent No.: US 6,658,167 B1
(45) Date of Patent: Dec. 2, 2003

(54) ON THE FLY SERVER FOR MODIFYING DATA CHARACTERISTICS FOR CLIENT-SERVER NETWORK APPLICATIONS

(75) Inventors: Daniel T. L. Lee, Los Altos, CA (US); Ho John Lee, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/240,470

(22) Filed: Jan. 31, 1999

(51) Int. Cl.[7] .............................. G06K 9/03; G06K 9/60; G06F 15/16
(52) U.S. Cl. ...................... 382/305; 382/311; 382/306; 709/246; 709/219; 709/217
(58) Field of Search ................. 382/276, 277, 382/303, 304, 305, 306, 307; 707/6, 10, 103; 700/220, 221, 232; 709/220, 225, 230, 226, 315, 217, 219, 246, 239, 231, 237, 238; 713/201, 202

(56) References Cited

U.S. PATENT DOCUMENTS

| 5,699,513 A | * | 12/1997 | Feigen et al. ............... 713/201 |
| 5,708,732 A |   | 1/1998  | Merhav et al. .............. 382/232 |
| 5,727,159 A | * | 3/1998  | Kikinis ................... 395/200.76 |
| 5,850,484 A |   | 12/1998 | Beretta et al. .............. 382/250 |
| 5,870,759 A | * | 2/1999  | Bauer et al. ................ 707/201 |
| 6,023,558 A | * | 2/2000  | Grabowski .................. 395/109 |
| 6,035,324 A | * | 3/2000  | Chang et al. ............... 709/203 |
| 6,098,108 A | * | 8/2000  | Sridhar et al. .............. 709/239 |
| 6,108,655 A | * | 8/2000  | Schleimer et al. ............. 707/10 |
| 6,119,051 A | * | 9/2000  | Anderson, Jr. et al. ...... 700/221 |
| 6,119,157 A | * | 9/2000  | Traversat et al. ........... 709/220 |
| 6,122,629 A | * | 9/2000  | Walker et al. ................. 707/8 |
| 6,167,567 A | * | 12/2000 | Chiles et al. ............... 717/173 |
| 6,216,157 B1 | * | 4/2001  | Vishwanath et al. ........ 709/208 |
| 6,226,650 B1 | * | 5/2001  | Mahajan et al. ............ 707/201 |
| 6,253,244 B1 | * | 6/2001  | Moore et al. ............... 709/231 |
| 6,272,555 B1 | * | 8/2001  | Gish .......................... 709/315 |
| 6,324,582 B1 | * | 11/2001 | Sridhar et al. .............. 709/230 |
| 6,507,867 B1 | * | 1/2003  | Holland et al. ............. 709/219 |
| 6,519,636 B2 | * | 2/2003  | Engel et al. ................ 709/223 |

* cited by examiner

*Primary Examiner*—Bhavesh M. Mehta
*Assistant Examiner*—Yosef Kassa

(57) ABSTRACT

The present invention provides a computer implemented method and apparatus for modifying data to be used by a client application in a client/server network. The steps for implementing the present invention include: transmitting information to the server computer from the client computer, wherein the transmitted information defines the intended use of data in a client application stored on the client computer; based on the transmitted information, modifying the data to optimize the data for its intended use by the client application, wherein such modification is performed by the server computer before transmitting the modified data to the client application. In the preferred embodiment, the modifications to the data are made as the request is made from the server application. The data modifications are performed by the server computer and are based on information about the client application's intended use of the data. Because the computations are made on the fly, the modified data files may be customized instantaneously.

18 Claims, 2 Drawing Sheets

ON THE FLY SERVER FOR MODIFYING DATA CHARACTERISTICS FOR CLIENT-SERVER NETWORK APPLICATIONS

BACKGROUND OF THE INVENTION

The increasing popularity of the Internet and the increased reliance on the client/server model for computer networks has resulted in increasing number of data files being transferred between computers across a network. Unlike the mainframe computer model, the client/server model distributes labor between the computers on the network. Computers that provide service to other computers on the network are typically referred to as servers. Computers that use the services of another computer are typically referred to as clients.

Referring to FIG. 1 shows a client-server configuration that includes a server 100 and a plurality of client computers 110a–c interconnected in a network. If the client computers 110a–c are connected to the Internet, they preferably include browser software stored on a memory storage medium in the computer. This browser software allows the client to access information stored on the web server. A typical access request would be a client request to the server to view or print an image file stored on the web server. Problems occur when, dependent on the specific application or the use intended by the client application, the client may want a different versions of or different properties than the image file sent by the server.

A specific example of the server transmitting an image file where the properties of the image file are not tuned for the particular client application, would be the transmission of an image file designed for viewing on a Macintosh computer, that is sent to a PC for viewing. Typically the gamma setting, is different for a Macintosh computer versus a PC. Since the gamma setting for a MAC will result in an image on a PC that is too dark, the client will either have to live with a too dark image or adjust the brightness of the image. Adjustment to the brightness of the image will typically be made manually by a client application.

A second example, where the client may want a data file transmitted from the server to have different properties, is the case where the compression algorithm used by the server is not tuned for the client application. Web pages on the Internet frequently include graphical image files that can be downloaded from a website. The problem associated with these image files is that, dependent upon the requested resolution, these files can be quite large. Because of the large size of these files, transfer of the image files between the server and client is often time consuming. Further, because transmission for the plurality of client computers may come across a single link, a bottleneck in the transmission of data can occur.

One way of dealing with the problems associated with large data transmission associated with image files is to compress image files. Typically image data files are compressed using a JPEG compression algorithm before transmission to the client application. JPEG defines a standard algorithm for image compression that represents images with less data in order to save storage costs as well as transmission time and costs. JPEG has gained great popularity because it allows the interchange of images between diverse applications. However, dependent on the client application requirements it may be appropriate to perform JPEG compression. For example, client applications typically exchange JPEG data streams as single resolution images regardless of the target resolutions. For example, typical displays have resolutions of around 72 dots per inch (dpi), whereas typical printers can handle 300–1200 dpi or higher. Consequently, displaying a print resolution JPEG image may be very inefficient. Furthermore, printing a display resolution JPEG image yields a very low quality output. Thus, there is a need for improved techniques for transmission of graphical image files in a network environment to improve the data quality of the image and so that the available bandwidth is used efficiently.

A method and apparatus which provides a means for modifying data to be transmitted across a network, in order to align the characteristics of the data to be modified for its intended use within a client application is needed.

SUMMARY OF THE INVENTION

The present invention provides a computer implemented method and apparatus for modifying data to be used by a client application in a client/server network. The data modifications are performed by the server computer and are based on information about the client application's intended use of the data. The modifications made to the data are made with the intent of optimizing the data for its intended client application use. However, because the optimization by the server occurs before data transmission to the client application, reductions in the amount of data transferred will help increase the bandwidth between the server and client computers.

The steps for implementing the present invention include: transmitting information to the server computer from the client computer, wherein the transmitted information defines the intended use of data in a client application stored on the client computer; based on the transmitted information, modifying the data to optimize the data for its intended use by the client application, wherein such modification is performed by the server computer before transmitting the modified data to the client application; and transmitting the modified data to the server computer. In the preferred embodiment, the modifications to the data are made as the request is made from the server application. Because the computations are made on the fly, the modified data may be immediately customized. The computation results are not dependent upon previously created files. Instead, any files or data created is created in response to requests made by the server.

Implementing the present invention typically requires modification or extension of both the standard server application and standard client application programs. The client application program stored on the client computer typically is modified so that it has the capacity to notify the server of its intended use. The server application program stored on the server is modified to respond to the information received from the client regarding the intended use. Typically, the modifications to the server and client application programs are done by modifying or extending the existing server and client application programs, although in some cases this added communication ability between the client and server application programs is accomplished by creating a new programs.

A further understanding of the nature and advantages of the present invention may be realized with reference to the remaining portions of the specification and the attached drawings.

DETAILED DESCRIPTION OF THE PREFERRED EMBODIMENTS

Figure 2:
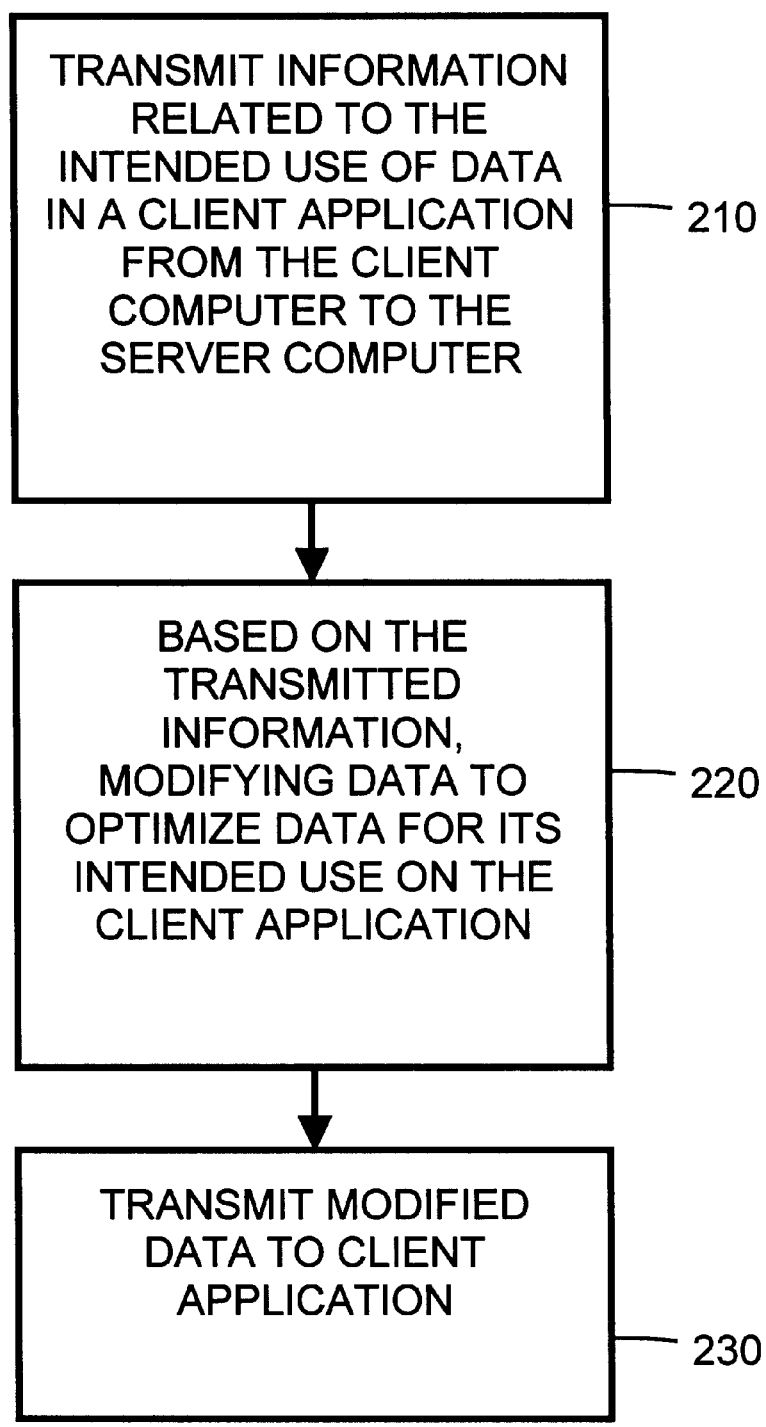
FIG. 2 shows a flowchart of the method according to the present invention.

Referring to FIG. 2 shows a flowchart of the method according to the present invention. The method includes the steps of: transmitting information 210 related to the intended use of the data in a client application from the client computer to the server computer; modifying the data 220 based on the transmitted information, wherein the purpose of modifying the data is to optimize the data for its intended use on the client application; and transmitting the modified data 230 to the client application.

Figure 1:
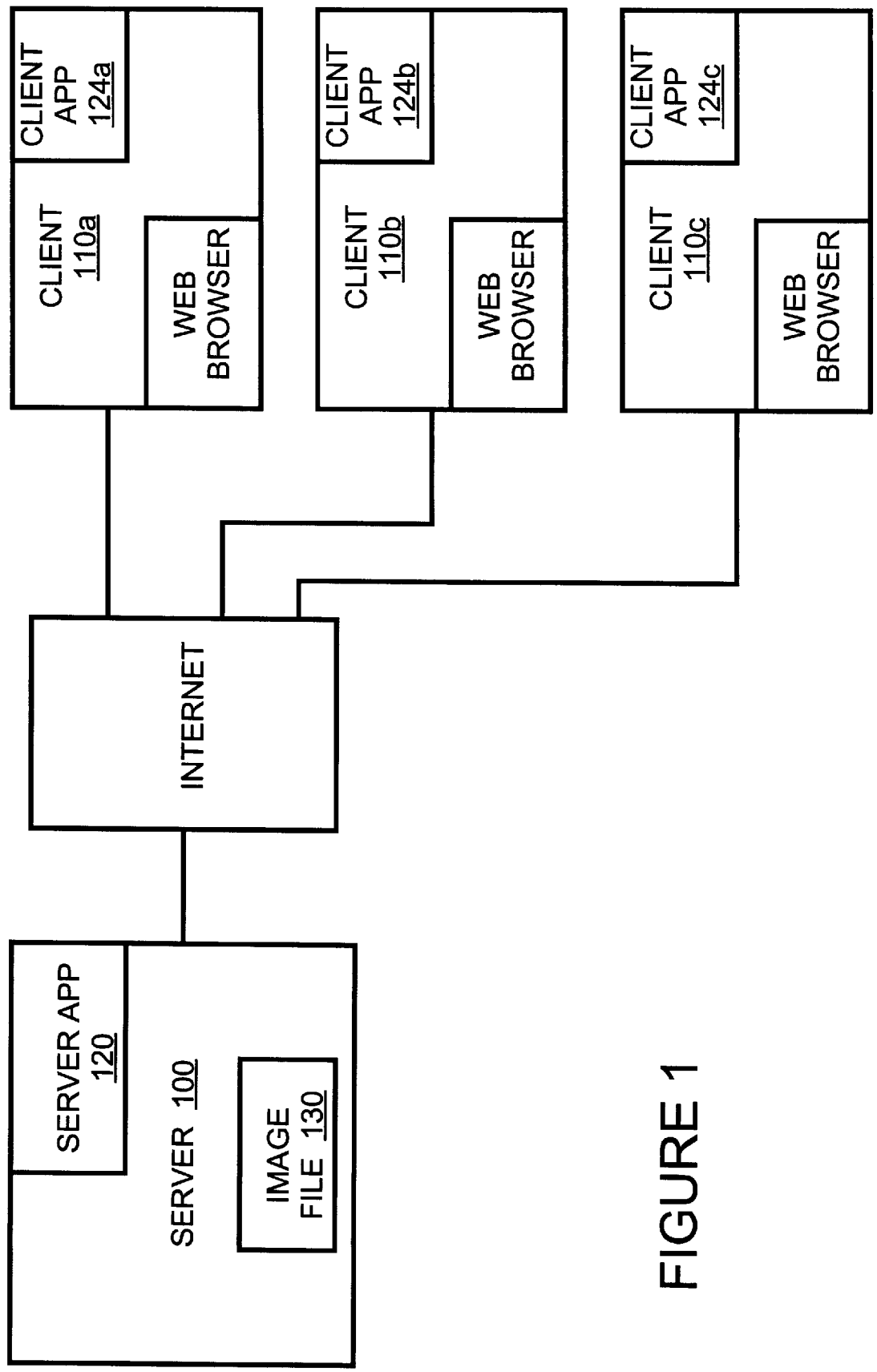
FIG. 1 shows a client-server configuration.

In the present invention, information related to the intended use of data is transmitted to the server and this transmitted information is used by the server application program to modify the data. Referring to FIG. 1 shows a client/server configuration that can be used to explain implementation of the present invention. Referring to FIG. 1 shows a server application program 120 stored on the server 100 in server memory and a client application program 124a–c stored in memory on its corresponding client computer 120a–c. Implementing the method described by the present invention typically requires extending or modifying both the client application program and the server application program that were used in past applications.

To implement the present invention, the client application program 124a–c stored on the client computer is modified so that it has the capacity to notify the server 100 of its intended use. The server application program 120 stored on the server 100 is modified to respond to the information received from the client 110a–c regarding the intended use. Typically, these modifications are done by modifying or extending currently existing programs, although in some cases this added communication ability between the client and server application programs is accomplished by creating a new programs.

To describe a possible implementation scenario of the present invention, assume that the data is an image file 130. The goal in the transmission of the image file is to send a high resolution image suitable for high quality printing but without paying the extreme penalty in download time. Assume that the software programs including the Internet Explorer web browser, HP's Openpix, and ActiveX are available and stored on the client computer. Consider the example of printing an image file from a web browser.

System preferences may be set up to specify, for example, preferred formats. Thus, when a Web browser makes a request to the Web server, the Web server may make assumption based on the client computer preference list. For example, assumptions may be made regarding the language, color space and formats to be used, how tables of information should be sent, or what type of encoding will be accepted. For a web browser these would be set on the client computer in the browser setting. For personalized on line publications, the list of publications requested and client preferences would typically be set on the server computer. Typically, in the present invention, the computer preference list is used as information related to the intended use of the client application or utilized in conjunction with the user's intended use in order to make judgments on how the data from the server will be output and sent to the client computer.

Typically, what happens when a command is given to the web browser is that a set of routines in the browser attempts to create a bitmap suitable for printing on a printer device. The browser will query the application for the preferences or parameters associated with the document. Typically, if the data file to be printed is an image, the browser will just print the image data it has. Unfortunately, under normal conditions, the image data the applicant has is the screen resolution image data which typically has poor resolution. (A screen resolution bitmap typically as a resolution of 75 dots per inch for the screen while 300–600 dots per inch is considered to be a desirable resolution for printed matter.) If the browser communicates with the Openpix viewer, the Openpix viewer will print a larger version of the screen resolution data, however, image quality is not significantly improved.

The problem is that although today browsers have access to information that the transmitted data is to be printed, it doesn't use that information to modify the file to be printed. The present invention modifies the client application and server application programs so that information about the client's intended use can be used to optimize the data transmitted from the server for its intended use.

The Internet Explorer browser includes application code that sends to the server, information about the intended use. When the pages are delivered from the server, the server looks at the page to see what references are contained within it (text, image, embedded components, etc.) If there are references to embedded components in the Web page, the browser will then check to see if it has a copy of that component already loaded. If it does not have a copy of the component loaded, it will go back to the server, download the appropriate the additional software, install it on the client system and then run that additional component with the parameters specified in the original Web page.

HP's OpenPix viewer is structured so that can be adapted to be an embedded components. Thus, if a browser, hits a webpage that has Openpix technology incorporated in it, the browser will search for the Openpix component, download and install it, and communicate with the server the parameters needed by the Openpix component. For Openpix, these parameters include the program size, the program location and the location of the image data.

In some application programs, the ability for the client to notify the server that it intends to print already exists. For example, Hewlett-Packard Company's Openpix software program (a client application program) notifies the server that it is going to print. This notification that the client intends to print, is typically not automatic, but instead is user initiated. Software programs such as Openpix, typically will have icons accessible by the user, which allow the user to interact with an icon, which may for example say "Click here to print."

Going back to the example of printing versus viewing an image file with Internet Explorer web browser. If the user says print, the user might choose between draft or best quality. These two options are manual preferences that may be set within the Openpix client. With draft quality you do not have the full maximum resolution that the printer will handle. Instead of just sending different resolution data based on whether draft or best quality is selected, the present invention may perform further optimization. Based on whether draft or best quality is selected and what the client application knows about the image, the system implemented according to the present invention may make a specific request to the server for more data. Typically without OpenPix, it wouldn't go back to the server for more data, it would just print the data it has. Further, based information that the client application reveals to the server (ie, intended use is printing best quality resolution on Inkjet printer), the server application software may decide based on the increased resolution requirement to recode the data to be transmitted to the client so that it is optimized for printing, such that the color space is smaller, transmission from the server to the client is faster, and the image quality is improved.

The determination of the draft or best quality is printed, and whether data is printed, is input by the client application. However, according to the system and method implemented by the present invention, the server application has access to information that is forwarded by the client application about the intended use. Based on the available information from the client application, the server application makes decisions on how to optimize the data. These optimizations are performed by the server computer and are performed on the fly.

By on the fly, Applicant means that the computations or modifications to the data are made as the request is made from the server application. Because the computations are made on the fly, the modified data files may be customized instantaneously. The computation results are not dependent upon previously created files. Instead, any files or data created is created in response to requests made by the server.

As previously discussed, large image files are typically compressed before transmission from the server to the client. Conventionally these image files are transferred using the popular JPEG algorithm. The JPEG algorithm has gained tremendous popularity because it allows for the interchange of images between diverse applications. However, dependent on the client application, another compression algorithm may be preferable or alternatively the parameters of the JPEG algorithm may need to be modified in order to be tuned for the client application.

JPEG is a visually or potentially a visually lossless coding format in which to optimize the coder. You can tune either one parameter (a "Q" factor, for the whole code) or alternatively you can also adjust 64 different parameters within the coding system. Tuning the JPEG system parameters compresses the image to different degrees so that the image decreases or increases in size with varying amounts of distortion. Typically, the more compressed an image is, the worse the quality of the image. However, in many environments it's possible to compress the data more while retaining most of the visual information based on knowledge about what the intended application.

Suppose for example, the server knows that the client application is going to print (intended use) a particular image file that it prints from a web browser. The server application program, knowing the size of the image file and intended client use, may want to compress the image data not using the standard JPEG compression algorithm. Knowing that an image is to be printed, the server may choose to use a JPEG compression algorithm that is optimized for printing. Because this optimized JPEG algorithm may be tuned for the specific client application, the optimized algorithm may actually compress the image more while retaining a higher visual quality than the routinely applied JPEG algorithm. For example, U.S. Pat. No. 5,850,484 to Beretta et al. and U.S. Pat. No. 5,708,732 to Merchav et al. both describe techniques which can be used in combination with or in place of the routinely applied JPEG algorithms. Thus, U.S. Pat. Nos. 5,850,484 and 5,708,732 may be used in combination with the present invention to optimize the data sent to the client application.

The present invention provides information about the intended use of data for a client application. In one embodiment, the specified use of the data by the client application is that the data will be sent to a monitor for viewing and information related to its use, such as the type and characteristics of the monitor, is sent to the server. For example, modifications to the data output to the client application, could be made based on whether the monitor is a TV monitor or a computer monitor. TV monitors for example use different phosphors than computer monitors, thus the color and brightness of the data represented by the monitor may need to be adjusted based on the type of monitor. Further, the color space and gamma setting for a Macintosh computer vary compared to a PC. In conventional systems, adjustment to the brightness of the image are made manually by a client application. In the present invention, the adjustment to the brightness of the image or colorspace will be made automatically by the server application program. Other modifications that can be made by the server application with respect to monitors, are adjustments based on whether the monitor is calibrated or not calibrated.

In an alternative embodiment, the server may modify data file before transmission to client based on the printing environment of the client. The characteristics of the data file could be modified based on the type of printer. For example, the data file characteristics could be modified based on the whether it was an HP Inkjet or HP LaserJet printer. Modification could further be made dependent on the series of printer. For example, a Laserjet IIISi Series of printers could have different characteristics to optimize for than the Laserjet 4Plus Series. Adjustments could also be made to make the print output be comparable to the image viewed. For example, the server knowing the client was viewing the image file on a MAC monitor and would be printing on an Inkjet printer could modify the image file so that the color space seen by the viewer on the Macintosh monitor would match the actual colors printed by the Inkjet printer. Further, adjustments may be made for the type of paper the printer is using. For example, printing might be adjusted for photo-quality paper compared to commercial stock paper. In addition, the data can be tuned for different colors, (RGB, CMKY, etc.) or different formats (JPEG, uncompressed TIF, etc.)

The method for implementing the present invention includes the steps of: transmitting information regarding the intended use from the client to the server computer. Based on the information transmitted, the server makes choices about how the data will be optimized for its intended use in the client application. These choices are coded into the server application program stored on the server. For example, information that the data is transmitted from an Openpix client, is to be printed on an Inkjet printer and the desired resolution may be transmitted to the server application program. Based on this information, the server program may tune the data for printing instead of viewing and will tune it to the characteristics of the Inkjet printer.

The server application program may also make other choices. For example, if the client application is an Openpix client, then the server application program may optimize the bitstream or alternatively the colorspace, but if is a different application program or alternatively if the printer is a Laserjet printer, it may choose not to make these modifications. Additionally, the server application program may have the ability to turn on or off a subsection of the available optimizations. For example, if the server application was coded to optimize the colorspace for an Openpix client printing to an Inkjet printer, this optimization could be turned off for the desired period of time by the user.

The present invention provides information about the intended use of data for a client application. One use of the data that could be specified is whether the data will be sent to a PDA. PDA's or personal digital assistant's typically implement wireless transmission of data. The screen of the PDA's is small compared to a computer or TV monitor. If the image file is designed for a computer or TV monitor, the size of the image will need to be reduced for the PDA. However, although the size is smaller, simply shrinking the size of the picture may not result in an image that maintains its visual quality. In some cases, what you really want to do is you want to translate the picture into something that's still meaningful while it's small.

The present invention provides information about the intended use of data for a client application. The data here will be sent to a PDA. Information transmitted about the characteristics of the PDA environment can be used to optimize data transmission. For example, PDA typically have a lot of restricted viewing capabilities compared to computer monitors. For examples, PDA monitors typically have a limited number of colors from which they can display, they are usually LCD displays instead of CRT displays and they have low contrast.

Assume that the data was originally tuned for a color monitor that has the availability of a higher number of colors that the PDA. Based on the knowledge of the particular PDA, the server application may tune the data so that it is optimized for the smaller number of colors available for a PDA. Another example, would have to do with shrinking the image without making the image quality too blurry. Normally when you downsample, you make the picture smaller, you filter and you make the picture smoother. However, for a PDA this sequence of events may make the resulting image quality too blurry and the user will probably want to retain a greater proportion of the features and preserve edges than it would if the server application was optimizing for a computer monitor. Thus, based on the knowledge of information related to intended use of the data (sent to PDA), the server application could use a different smoothing algorithm than is used for a computer monitor.

It is understood that the above description is intended to be illustrative and not restrictive. The scope of the invention should therefore be determined with respect to the appended claims, along with the full scope of equivalents to which such claims are entitled.

What is claimed is:

1. A method for modifying data to be used by a client application stored on a client computer, the method including the steps of:
   (a) transmitting information to a server computer from the client computer, wherein the transmitted information defines an intended use of data in the client application, wherein the transmitted information specifies the data is to be printed;
   (b) modifying the data based on the transmitted information, such modification being made to optimize the data for the intended use of the data by the client application as defined by the transmitted information, wherein such modification is performed by a service application stored on the server computer; and
   (c) transmitting the modified data to the client computer.

2. A method as in claim 1 wherein in step (a) the transmitted information also specifies the data is to be sent to a personal digital assistant.

3. A method as in claim 1 wherein in step (a) the transmitted information also specifies a type of monitor on which the data is to be displayed.

4. A method as in claim 1 wherein in step (a) the transmitted information also specifies a type of printer on which the data is to be printed.

5. A method as in claim 1 wherein step (b) includes optimizing data for printing on a particular type of printer.

6. A method as in claim 1 wherein step (b) includes using a compression algorithm for compressing the data, the compression algorithm being selected based on the transmitted information.

7. A method as in claim 1 wherein step (b) includes using a compression algorithm for compressing the data, parameters for the compression algorithm being selected based on the transmitted information.

8. A method as in claim 1 wherein step (b) includes changing color and brightness of an image represented by the data.

9. A method as in claim 1 wherein step (b) includes changing color space and gamma of an image represented by the data.

10. A method as in claim 1 wherein step (b) includes changing base colors for an image represented by the data.

11. A method as in claim 1 wherein step (b) includes changing resolution of an image represented by the data.

12. A method as in claim 1 wherein step (b) includes changing size of an image represented by the data.

13. A method as in claim 1 wherein step (b) includes reducing a number of colors used to display an image represented by the data.

14. A method as in claim 1 wherein step (b) includes reducing a number of colors used to display an image represented by the data.

15. A method as in claim 1 wherein in step (a) the received information also specifies a type of printer on which the data is to be printed.

16. A method as in claim 1 wherein in step (a) the received information also specifies a type of monitor on which the data is to be displayed.

17. A method performed by a service application, the method comprising the following steps:
   (a) receiving information from a client application executing on a remote computing system, the received information indicating an intended use of data requested by the client application, wherein the received information specifies the data is to be printed;
   (b) modifying the data based on the received information, such modification being made to optimize the data for the intended use of the data by the client application as indicated by the received information, wherein such modification is performed by the service application; and
   (c) transmitting the modified data to the remote computing system.

18. Storage media that stores a service application, the service application when executing on a computing system performing a method that comprises the following steps:
   (a) receiving information from a client application executing on a remote computing system, the received information indicating an intended use of data requested by the client application, wherein the received information specifies the data is to be printed;
   (b) modifying the data based on the received information, such modification being made to optimize the data for the intended use of the data by the client application as indicated by the received information, wherein such modification is performed by the service application; and
   (c) transmitting the modified data to the remote computing system.

* * * * *